INVENTORS.
Earle B. Ellis
Carl E. Chesney
BY Scofield, Kokjer, Scofield & Lowe
ATTORNEYS.

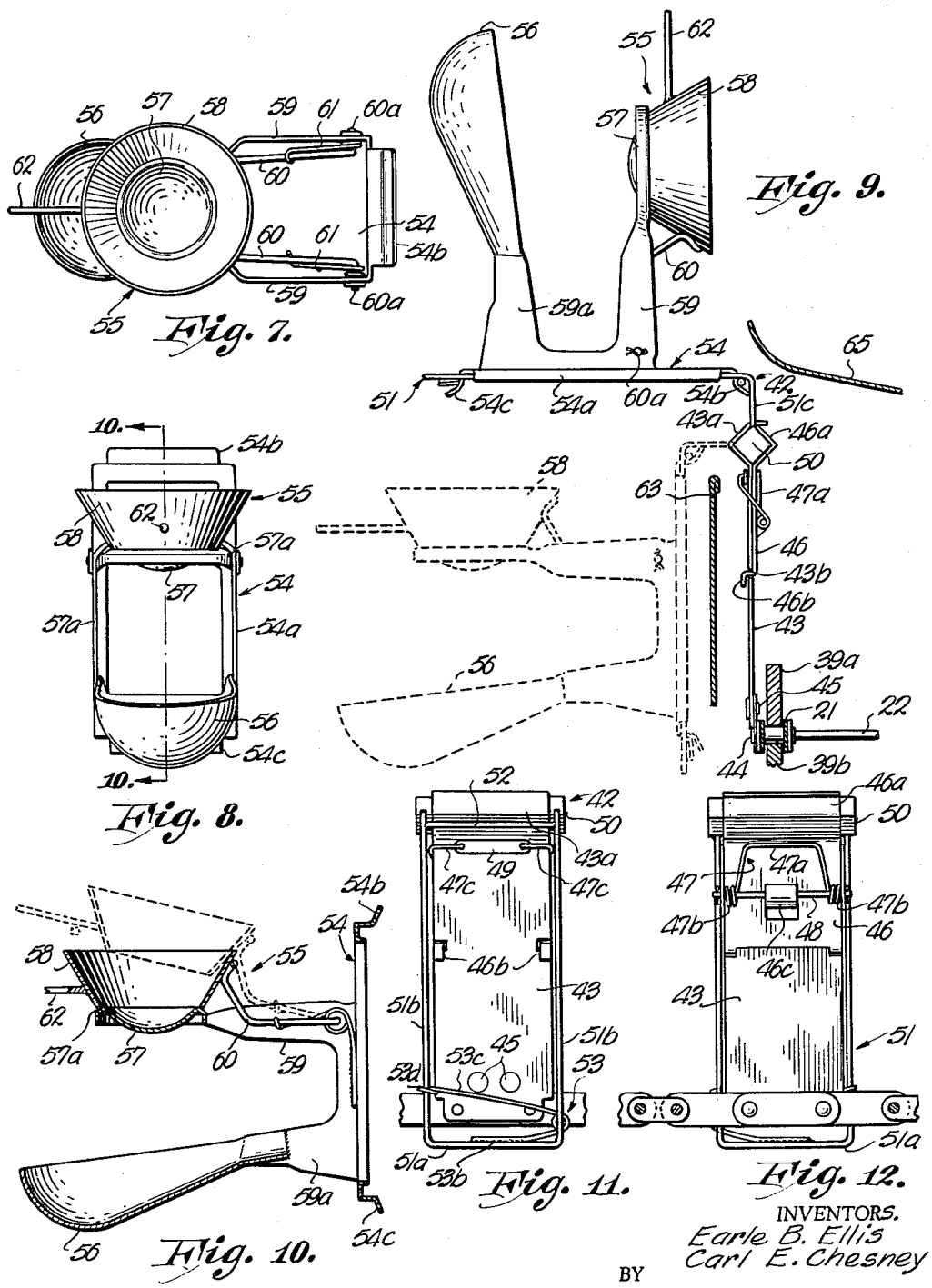

United States Patent Office 3,185,194
Patented May 25, 1965

3,185,194
EGG SEPARATING APPARATUS
Earle B. Ellis, Mission, and Carl E. Chesney, Kansas City, Kans., assignors to Standard Brands Incorporated, New York, N.Y., a corporation of Delaware
Filed May 16, 1963, Ser. No. 280,918
16 Claims. (Cl. 146—2)

This invention relates generally to egg processing equipment and deals more particularly with improvements in apparatus for receiving the contents of eggs from an egg breaking machine and for separating the whites from the yolks.

One of the general objects of the invention is to provide apparatus of the character described so constructed that it enables handling of the eggs at a greater numerical rate than can be obtained in other machines of which we are aware and, even with this faster rate, will operate to provide improved quality of separation of the yolks from the whites along with convenient useful disposition of the occasional eggs encountered that have ruptured yolks. It is a particular feature of the invention in the latter respect that the separation of the yolks from whites is accomplished in fully automatic fashion and that the collection of otherwise usable egg contents (those not qualified for separation into yolks and whites) is made possible with a minimum of effort required on the part of a human operator.

Another general object of the invention is to provide apparatus of the character described which is so constructed that it provides optimum opportunity for maintaining high standards of quality control of the resulting separated whites and yolks and while retaining the high volume of production earlier mentioned. In apparatus embodying the invention, the whites, in particular are handled in such fashion that they can be carefully inspected at several stages in the separation operation and before they are delivered to the final collection destination.

A further and more specific object of the invention is to provide egg separating apparatus having a moving endless carrier from which a plurality of egg contents collecting units are supported in serially spaced relationship and which has improved support means for the collector units rendering their attachment to and separation from the carrier a task involving little effort or time on the part of an attendant. A corollary feature of the invention in this respect is that the support means nevertheless is capable of holding the egg collectors in desired operating positions with great firmness.

Still another object of the invention is to provide apparatus of the character described which is relatively simple in construction, which can be operated with low power requirements and which can successfully be run at high speeds with but a single attendant required to perform such manual functions as are necessary.

Other and further objects of the invention together with the features of novelty appurtenant thereto will appear in the course of the following description.

In the accompanying drawings which form a part of the specification and are to be read in conjunction therewith and in which like reference numerals indicate like parts in the various views;

FIGS. 1a and 1b taken together show a side elevation of a preferred apparatus embodying the invention, portions of the support legs and other structure being cut away and other parts being broken away for purposes of illustration; the empty carrying brackets in these figures, as in FIGS. 3 and 4, are shown as empty only for the purposes of illustration, it being the intended mode of operation to employ cup structures on all of the carrying brackets;

FIG. 7 is a greatly enlarged top plan view of the collector cup structure disassociated from its support bracket;

FIG. 8 is a front elevational view of same;

FIG. 9 is a partly sectional view taken generally along line 9—9 of FIG. 1b in the direction of the arrows;

FIG. 10 is a sectional view taken along line 10—10 of FIG. 8 in the direction of the arrows;

FIG. 11 is an enlarged detail front elevational view of the cup structure support bracket;

FIG. 12 is a rear elevational view of the same; and

Figure 1:
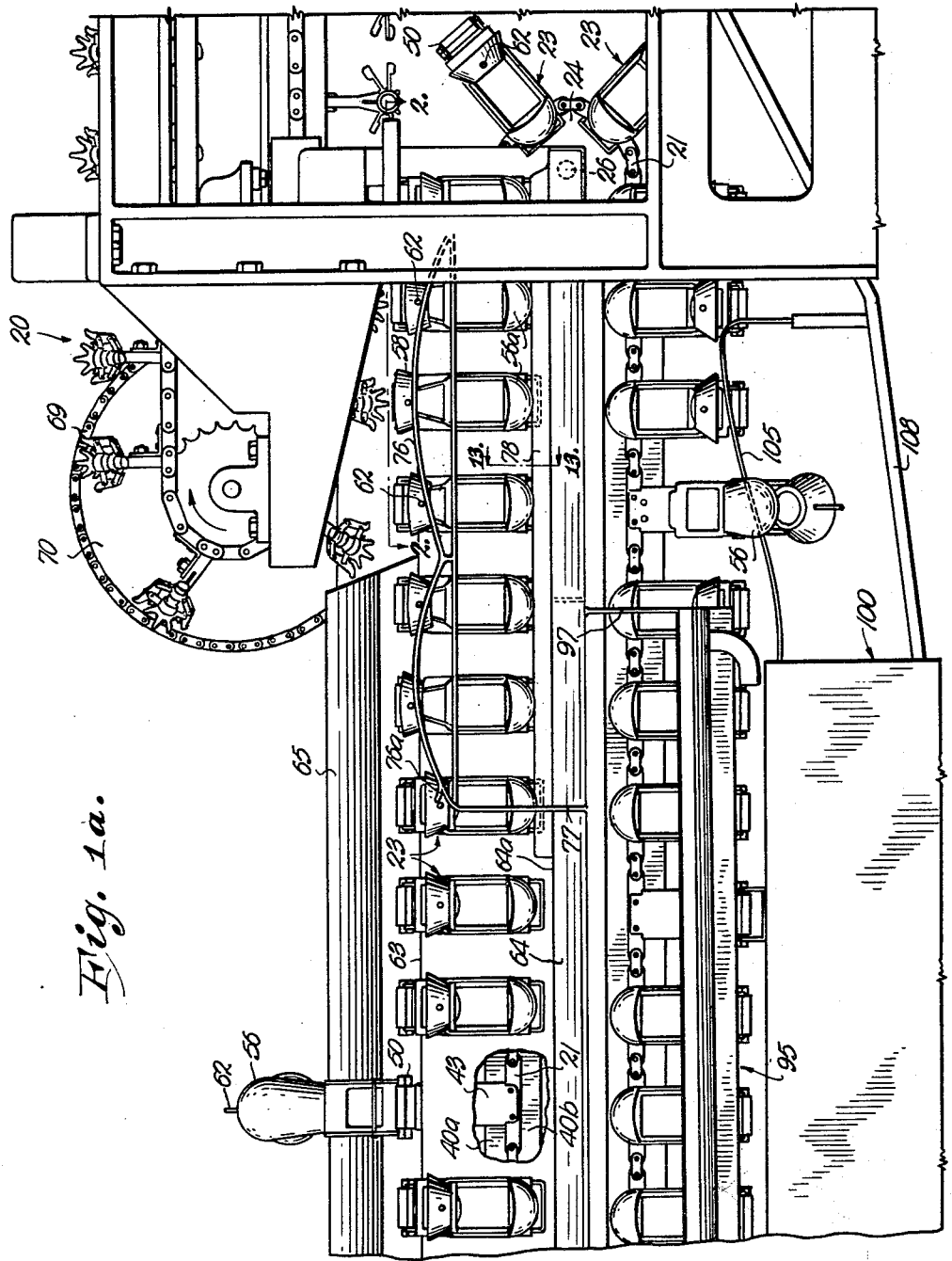
Figure 2:
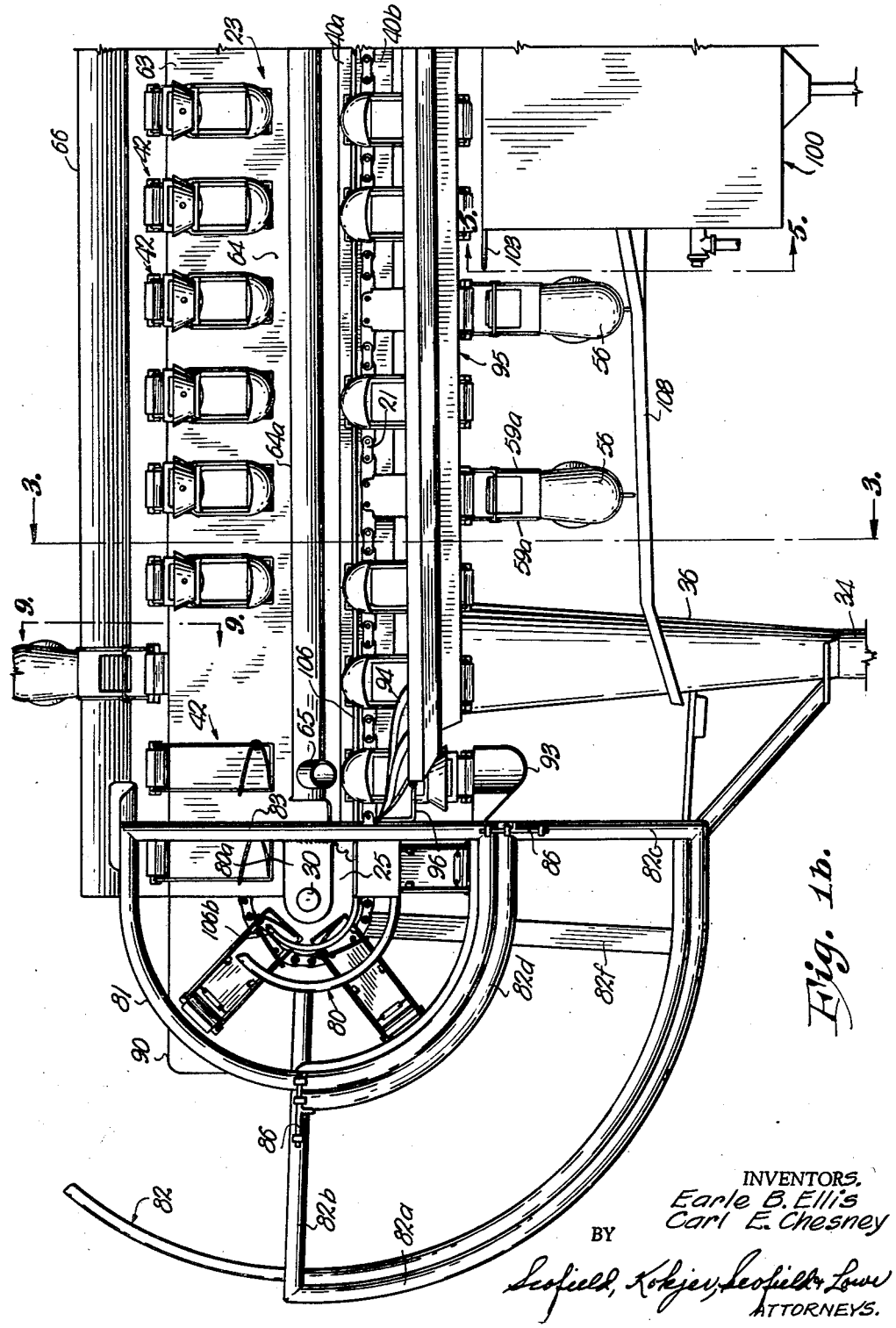
FIG. 2 is a fragmentary section on a reduced scale taken generally along the line 2—2 of FIG. 1a in the arrows.

Referring now to the drawings and initially to FIGS. 1a, 1b and 2, reference numeral 20 identifies generally the terminal portion of a suitable egg breaking apparatus of the type capable of breaking and separating the shells of successive eggs so as to permit gravity discharge of the contents into a collection means therebelow. In the apparatus illustrated, this is accomplished while the eggs are moving and our separating apparatus is particularly suitable for use in conjunction with a breaking machine of this type. However, any suitable breaking apparatus may be used and since the details of the breaking apparatus play no part in the present invention, it will not further be described except to refer to the manner of synchronization of the drive of the breaking apparatus with drive to the separation apparatus.

The main operating component of the preferred embodiment of the present separating apparatus comprises an endless carrier in the form of a pair of spaced roller link chains 21 which are joined together in laterally spaced relationship by cross studs 22. The carrier serves to provide a moving support for a series of egg contents collector units generally identified as 23 and to be described later in full detail. The chains 21 are trained at the end of the apparatus adjacent the breaking machine around spaced parallel sprockets 24 and extend horizontally therefrom to provide parallel upper and lower flights, being trained at the far end around sprockets 25. The sprockets 24 are mounted on a horizontal shaft 26 which is journaled in any suitable fashion, as by bearing 27. In the preferred embodiment, the bearing is secured to the end of a channel-shaped structural member 28 which extends the full length of the carrier between the sprockets. A similar bearing (not shown) is located at the opposite end of the structural member and shaft 30 which carries sprockets 25 is journaled therein.

Figure 3:
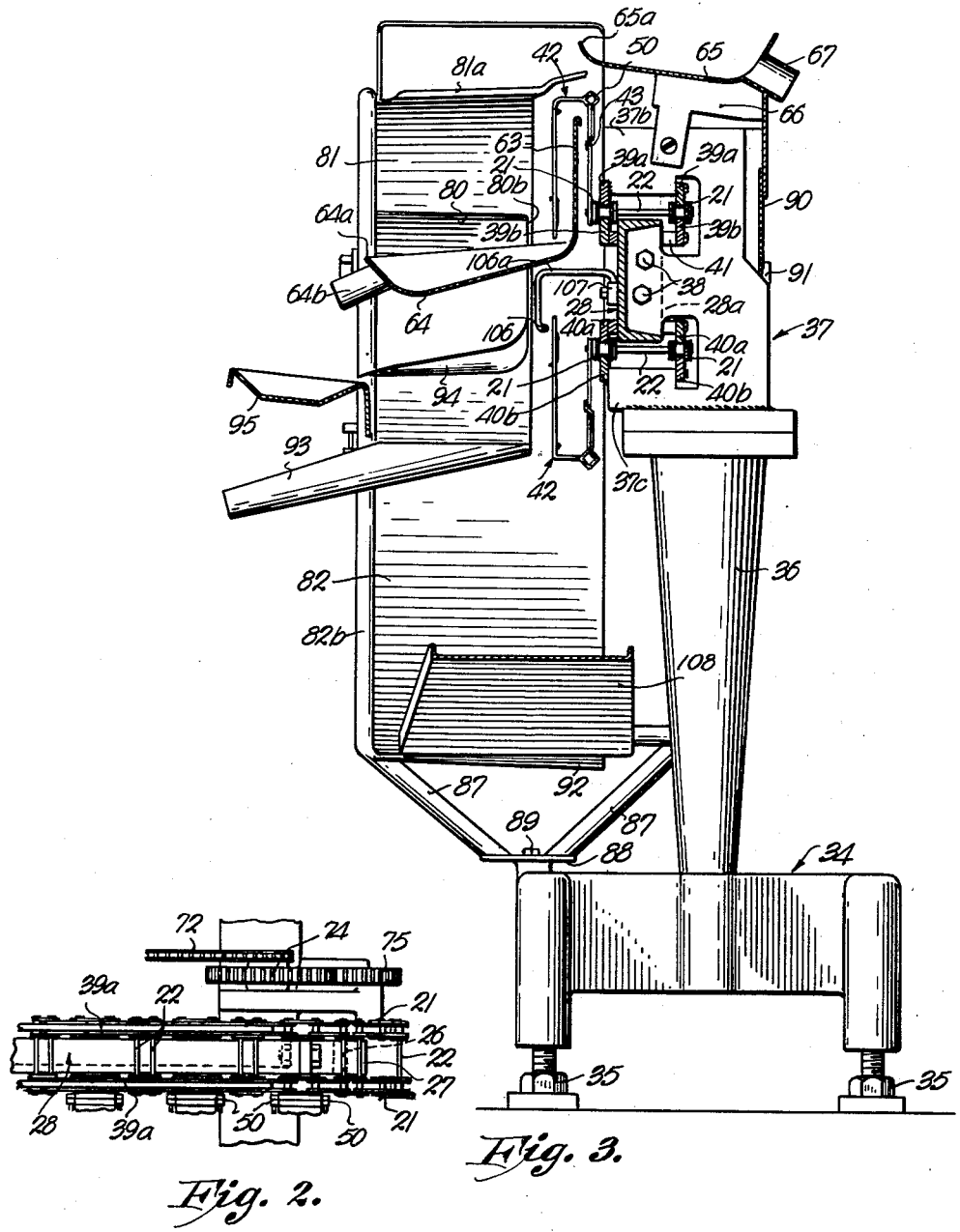
FIG. 3 is a sectional view taken along line 3—3 of FIG. 1b in the direction of the arrows.

The structural member 28 may be supported at spaced intervals in any convenient fashion, one type of support being that shown in detail in FIG. 3. It will be understood that as many supports as are required can be used. The support comprises a bipod 34 which rests upon the floor, the bipod having adjustable floor contacting feet 35. Centrally from the bipod rises the pedestal 36. Secured to the top of the pedestal is a bracket member 37 having the head portion 37a which fits into the channel 28 and which is securely bolted by bolts 38 to a cross web 28a formed integral with or rigidly secured within the channel.

The upper and lower flights of each of the chains 21 are guided and restrained in horizontal planes by pairs of upper and lower bars or rails running parallel with the upper and lower flights of the chains and closely adjacent the upper and lower surfaces of each flight. The pairs of rails for the upper flights bear reference numerals 39a, 39b and those for the lower flights 40a, 40b. The rails or guide bars can be supported in any suitable fashion providing a relatively rigid mounting therefor, for example by securing them by suitable fasteners (not shown) or welding them to the adjacent support portions 37b, 37c, formed on member 37 and to the spacers 41 secured to the channel member 28.

Secured to the near chain 21 (as viewed in FIGS. 1a and 1b) at uniformly spaced intervals are a plurality of identical bracket structures 42, the details of which are more clearly seen in FIGS. 9, 11 and 12. Since all the bracket structures are identical, only one will be described.

The bracket structure includes the plate-like element 43 which is securely riveted along its lower edge, as by rivets 44 and spacers 45, to the side of the chain 21. The plate element is disposed in a vertical plane and, when on the upper flight of the carrier, extends upwardly well above the carrier. The upper end portion of plate element 43 is bent into a V-shaped segment 43a to form one-half of a rectangular sleeve. The other half of the sleeve is formed by the similarly bent upper edge portion 46a of a smaller plate element 46 disposed parallel with and in contacting engagement with the plate 43. Offset tab 46b are located at the lower edge of plate element 46 and these are interclocked in registering notches 43b formed in the side edges of plate element 43.

The smaller plate member 46 is yieldably held in flat contact with the main body by a spring 47 having the central U-shaped portion 47a bearing thereagainst. The coiled torsion portions 47b of the spring are wrapped on a rod 47 held by a central tab 46c struck from the element 46 and curled back over the rod. The terminal ends 47c of the spring extend around to the front of the main plate 43 where they are connected by a strap 49.

Received in a tight fit in the rectangular sleeve is a hinge bar 50 of similar rectangular cross section. This bar serves to provide support for a generally rectangular frame-like member 51 which, as will subsequently be seen, is operable to receive and support a collector structure 23.

The member 51 is conveniently formed from good quality wire stock bent generally to a U-shape, the member having the lower bight portion 51a and the parallel legs 51b, both of which have laterally directed end segments 51c which are welded or otherwise securely affixed to the opposite end portions of bar 50 that extend beyond the sleeve. An upper cross bar 52 bridges between and is secured at its ends to the respective legs 51b. At the lower end of the frame member, there is provided a spring 53 much like a safety pin spring. This spring has the portion 53a welded or otherwise securely affixed to the bight 51a of the frame, the coiled spring portion 53b and the cross bar portion 53c which extends across the frame and is connected with a leg of the frame by the eye portion 53d which loosely encircles the leg.

The collector cup structure is seen in detail in FIGS. 7, 8, 9 and 10, being shown disassociated from the bracket member in FIGS. 7, 8 and 10. The cup structure includes a mounting base 54 of generally rectangular open frame-like configuration. The base 54 has the parallel side channels 54a which are respectively adapted to engage over the corresponding side legs 51b of the bracket frame 51. At the upper and lower edges of the cup base 54 are offset tabs 54b, 54c, respectively, which are engageable behind the upper cross bar 52 of the bracket frame and the spring arm 53c. These tab portions are of a length such that they can pass freely between the side legs 51b. Base member 54 is attached to the frame 51 by inserting the lower tab 54c to the inside of spring arm 53c, pushing downwardly on the base member and thereby depressing the spring until the upper tab 54b can pass inwardly beneath cross bar 52 and then relieving the downward pressure on the base member. The spring arm lifts the base member and locks behind the lower tab so that the upper tab is locked behind cross bar 52 with the lower tab behind the spring.

The base 54 carries the upper and lower cup elements 55, 56, respectively.

The upper cup element 55 is a two-part structure having the shallow dish-like stationary bottom member 57 and the frusto-conical movable upper wall member 58. The bottom 57 is provided with the reversely bent circumferential flange portion 57a (FIG. 10), the downwardly inclined upper surface of which provides a seat for the similarly inclined lower edge of the wall member 58. Spaced arms 59 project outwardly from the base and connect with and support the bottom member 57.

The movable wall member 58 is connected with the outer ends of a pair of symmetrically arranged pivot arms 60 having oppositely outturned inner ends 60a journaled in suitable apertures in the side arms 59. Torsion springs 61 associated with each pivot arm bias the wall member 58 toward the seated condition. A camming finger 62 extends forwardly from the front of the wall member 58; its purpose will later be described.

The second or lower cup element 56 is of the generally spoon-shape illustrated in the drawings and is supported from the base 54 by the side arm portions 59a. It will be noted that the area of the top opening in the lower cup 56 is substantially greater than the overall diameter of the bottom member 57 of the upper cup element.

Returning now to further description of the overall apparatus and turning attention again to FIGS. 1a, 1b, 2, 3 and 4, during their movement along the upper flight the collector units 23 are normally disposed with the cup structure located in front of a vertical partition 63 and the bracket plate 43 behind the partition. The partition is formed as the upstanding rear wall of an elongate tray or pan structure 64 running substantially the full distance between the sprocket shafts 26 and 30. The pan structure 64 underlies the collector units as they move along the upper flight. It has the front wall 64a which is provided at a suitable location with a discharge spout 64b. The tray 64 is supported in any suitable fashion, as by securing it at one end to the frame of the breaking machine and at the other to the supports for the baffle members later to be described.

Figure 5:
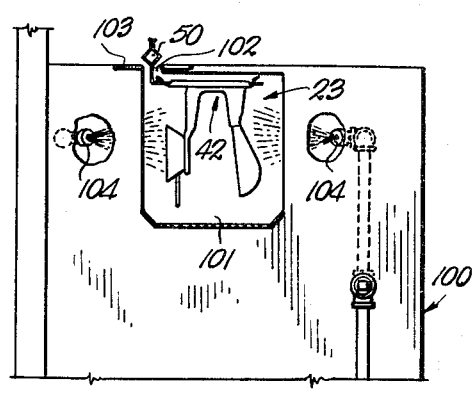
FIG. 5 is a partially schematic but sectional view taken generally along line 5—5 of FIG. 1b in the direction of the arrows.

Running lengthwise above the carrier is another elongate tray structure 65. This tray structure includes a front lip 65a which is positioned above and just outwardly of the plane of bracket plates 43. The upper tray is carried by connector brackets 66 (FIG. 5) which, in turn, are connected to and supported from the upper ends of the members 37. A discharge spout 67 is provided at an appropriate location in the rear wall of the upper tray 65.

It may contribute to an easier understanding of the construction and operation of the remainder of the apparatus to proceed at this point with a description of the basic manner of operation of the carrier and its associated collector units 23.

Figure 6:
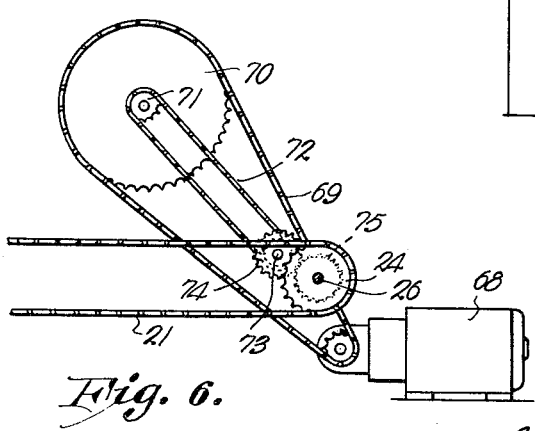
FIG. 6 is a diagrammatic showing illustrating the drive connection from the breaking machine motor to the separator apparatus.

The carrier can be driven from the power source for the breaking machine, an appropriate arrangement therefor being schematically shown in FIG. 6. In this arrangement, the motor 68 is drivingly connected by chain 69 to the main power sprocket 70 of the breaking machine. This sprocket can be seen in FIG. 1a. The shaft on which sprocket 70 is carried has mounted thereto a second, smaller sprocket 71. The latter is, in turn, drivingly connected by a chain 72 to a sprocket on a shaft 73 bearing the gear 74. Gear 74 meshes with a similar gear 75 keyed to the carrier shaft 26 adjacent the breaking machine. Thus the carrier chains 21 are driven in such fashion that the upper flight proceeds away from the breaking machine.

The contents of successive eggs are deposited by the breaking machine in the upper cup elements 55 of the collector units as the latter register with the breaking units of the breaking machine. This occurs almost immediately after the ascendancy of the collector unit to the upper flight of the carrier. The entire egg contents, the yolk and white, is deposited in the upper cup element 55 and is initially retained therein since the conical wall section 58 is held in closed relationship with bottom section 57 by springs 61. The egg yok will naturally center itself in the shallow bottom section with the white thereabove.

As the collector advances along the upper flight away from the egg receiving zone, its camming finger 62 engages and is cammed upwardly by a cam track 76 lying in the path of the finger. In the preferred embodiment, this track is formed of rod and is supported in any suitable fashion as by connecting one end with the breaking machine frame and the other with a standard 77 rising from and secured at its lower end to the front lip of the tray structure 64.

The camming track 76 is of generally double rise curvature as illustrated, and induces a double opening and closing of the conical wall member 58 relative to the yolk holding bottom member 57. We have found this to produce better separation of the white from the yolk. The first opening and closing cycle takes care of the so-called "thin" white while the second cycle results in separation of the "thick" white. During the times that the conical member is open, the egg white flows through the opening to the lower cup member 56 where it is retained. The trailing end of the camming track is provided with an upturned tip 76a which lifts the finger 62 slightly and then releases it abruptly permitting the spring 61 to snap the wall member 58 into its normal seated position. This has the effect of causing the lower edge of the wall section to clip or cut cleanly any strands of "thick" white still clinging to the yolk and assures that substantially complete separation has been effected.

Figure 13:
FIG. 13 is an enlarged fragmentary detail section taken generally along line 13—13 of FIG. 1a in the direction of the arrows.

During the initial phase of movement along the upper flight of the carrier, the lower ends of the collector units are restrained against lateral movement by providing the guide flange 78 (FIG. 13) which receives and confines the lower end of bracket frame 51. However, once the end 78a of this flange has been cleared, the collector units are free to be manually swung, on the occasions necessary to do so, to the upper, horizontal position illustrated in solid lines in FIG. 9.

The collector units are normally held in the vertical position through the coaction between the square hinge bar 59 and the cooperating sleeve sections 43a and 46a. However, pivoting of the bar is possible due to the separability of the sections against the action of spring 47. Once the bar has turned past 45° from its normal position, the sleeve sections will start to reclose about the bar and when the 90° position is reached, they are fully closed and hold the collector unit in the raised condition.

The raising of the collector units is done in cases where the egg in the unit has a ruptured yolk and there has been an intermixing of the yolk with the white. Because of the length of the apparatus, there is ample time to inspect the individual collectors as they pass by. Upon raising, the contents of the upper cup element 55 are discharged to the upper tray structure 65 while those of the lower cup element 57 will fall through the open base frame 54 and into the lower tray structure 64. The respective tray bottoms are so disposed relative to the horizontal as to cause the discharged egg contents to flow slowly toward the discharge spouts 64b and 67 and these can be connected by suitable tubing or piping (not shown) to selected collection, packaging or storage points.

Those collector units carrying eggs which, upon inspection, are determined to be spoiled are removed bodily from the carrier so that the spoiled egg can be disposed of and the collector properly cleaned. Upon removal, a clean collector unit is replaced in its position, removal and replacement being accomplished in the fashion earlier described.

The collector units carrying eggs which have been properly separated into yolks and whites are permitted to continue without interruption. As they move through the transition from the upper flight of the carrier to the lower flight at the far end of the apparatus, the yolks and whites are separately collected and handled by the mechanism now to be described.

Figure 4:
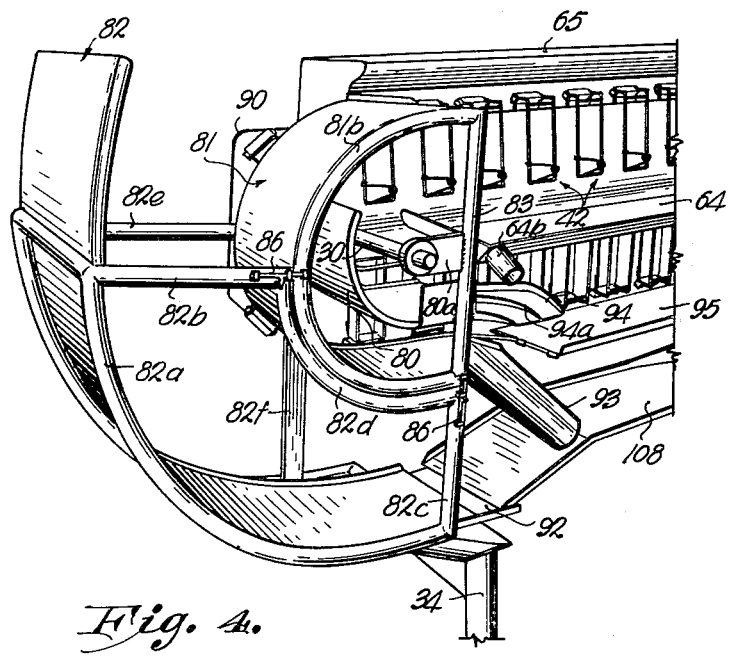
FIG. 4 is an end perspective view on a somewhat reduced scale taken from the left hand side of FIG. 1b.

Referring to FIGS. 1b, 3 and 4, positioned generally in the path of the collector units is a series of radially spaced arcuate baffle-like members identified respectively herein as the inner baffle 80, intermediate baffle 81 and outer baffle 82.

The inner baffle 80 is positioned so that it lies at all points in a location between the paths followed by the respective cup elements 55, 56 of the collector units as they descend in transition from the upper flight of the carrier and thus in position to catch and guide the egg whites as they are decanted from the cup elements 56. Baffle 80 is supported by the connector piece 80a from the upright 83. The inner edge 80b of the baffle is so located as to permit free passage thereby of the collector units.

The intermediate baffle 81 lies outside the transition path of the upper cup elements 55 and is positioned to catch the yolks as they are successively decanted from the upper cup elements. In order to assure that no drippings from the raised collector elements are mixed into the separated whites and yolks, the intermediate baffle is made as a substantially 180° arc having the upper edge 81a located ahead of the downturn point for the collector units. The upright 83 is connected with the tube-like outer edge 81b of the intermediate baffle. The upright is partially stabilized by connecting with shaft 30 a bracket 84 extending from the upright and having a bearing 85 surrounding the shaft and forming a connection link between the upright and the shaft.

The outer baffle 82 is spaced outwardly from the axis of shaft 30 sufficiently to permit passage of the raised collector units 23. Its purpose is simply to catch any drippings from the raised collectors and so that the floor around the machine will remain free of drippings and debris. Its tube-like or rolled outer edge 82a has rigidly interconnected therewith the inwardly extending spokes 82b, 82c, which are joined by the arcuate segment 82d. Slide bolts 86 detachably connect the outer baffle structure with the intermediate baffle. Diagonal brace members 87 support the lower edge of the outer baffle from the knee of the bipod 34, these being connected together into the bipod by plate 88 and bolt 89.

Spoke-like braces 82e, 82f are located at the inside edge of the outer baffle. These connect to a plate 90 which is detachably secured in any convenient fashion to the support member 37 as by bolts 91 (FIG. 3). The web of the outer baffle connects at its lower edge with a drain trough 92.

The detachable connections employed in supporting the baffle members permit of their ready removal for cleaning whenever necessary or desirable.

It will be observed that the intermediate baffle 81 is formed to provide a lateral discharge trough 93 which extends outwardly and beneath the outer lip of which can be placed a desired receptacle (not shown) for collection of yolks.

The inner baffle 80 has formed at its lower end a continuing curved descending flow trough 94. To promote flow in this trough, it is made relatively wide and is provided centrally with curved guide means 94a which act to keep the white distributed relatively uniformly in the tray and prevent it from piling up at the edges. This flow tray discharges into the elongate tray structure 95 which runs along the front of the machine so that its contents are in full view of an operator who would be adjacent the machine. This tray is inclined slightly downwardly from the point of reception of the whites and as the whites move therethrough toward the discharge spout 95b, they can be inspected and any blemishes, pieces of egg shell or the like removed.

The tray 95 is supported by any suitable connecting brackets. In the preferred embodiment, this includes the bracket 96 secured to and extending from upright 88 and the hanger rod 97 at the input end of the device. As in the case of the other tray, the discharge spout 95a for the tray 95 can be connected with a hose or other conduit through which the whites can be channelled to a suitable storage point.

Positioned generally centrally beneath the unit and adjacent the lower flight of the carrier is the collector washing chamber 100. The chamber may be constructed from sheet metal and, in the illustrated embodiment, is of rectangular box-like configuration. It is provided with a front opening 101, a lengthwise top opening 102 and a rear opening similar to the front opening. The openings are so dimensioned and aligned with each other and with respect to the carrier as to permit passage through the chamber of all collector units that have been raised to dispose of the broken yolk eggs. Converging guide bars 103 aid in directing the collectors into the washing chamber in the event that they may accidentally be offset one way or another from the 90° pivoted position to which they are raised, as earlier described. Internally, the chamber is provided with spray heads 104; these are supplied with hot water or detergent solution through conventional piping. While not shown, drying fans or blowers or heaters can be included in the chamber 100.

As the "raised" collector units leave the washing chamber, they are automatically returned to the normal position on the carrier so that they will be ready to receive another egg. This is accomplished by means of a cam rod 105 (FIG. 1a) disposed to lie in the path of the collector unit as it leaves the chamber and to effect pivoting of the collector back toward the carrier. The bar engages the support structure for the cup element 55 of each collector and is curved so that the displacement of the collector in response to engagement by the camming bar is sufficient to return the collector to the egg-receiving condition. The camming bar can be supported from the wall of the washing chamber and from the breaking machine frame.

The nonraised collectors, i.e. those that remained unpivoted during the movement across the upper flight, remain in this condition as they return on the lower flight. A safety guide or retainer rod 106 is positioned to lie just outside the free end of the frame 51 of the collectors and thus in position to retain the frame in the upright position with respect to the carrier if there is any tendency to pivot from this position. This retainer rod is supported in part by providing a leg portion 106a (FIG. 5) which is connected as at 107 with the web of channel 28. Preferably, it has an arcuate segment 106b that serves to prevent accidental pivoting of the collectors on their hinge bars during the descent to the lower flight.

The machine is completed by the provision of drip pans and surfaces 108, these pans being positioned below the path of the collectors as they move along the lower flight of the conveyor.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In an egg separating apparatus, the combination of an endless carrier having substantially horizontal, vertically spaced upper and lower flights, means supporting and driving said carrier for movement of the upper flight in a selected direction, a plurality of collecting units spaced serially along and connected with said carrier, each said unit including a pair of cup members set to one side of the carrier, the said cups in each pair upwardly open and vertically spaced during movement of the members across the upper flight, and a separating baffle located at that end of the carrier toward said selected direction and disposed between the cup members of each pair during their transition passage from the upper flight to the lower flight, said baffle operating to receive the gravity discharged contents of the advancing lowermost cup of each pair.

2. The combination as in claim 1 including a flow tray structure positioned adjacent and running alongside said carrier, and flow means connecting said baffle with said tray whereby to direct matter intercepted by the baffle to said tray.

3. The combination as in claim 2 wherein said tray structure is slightly downwardly inclined in the direction proceeding away from said baffle.

4. The combination as in claim 1 including a second baffle positioned to the outside of the uppermost cup as it proceeds from the upper to the lower flight and operable to receive the contents of said uppermost cup during said transition movement.

5. In an egg separating apparatus, the combination an endless carrier having substantially horizontal, vertically spaced upper and lower flights, means supporting and driving said carrier for movement of the upper flight in a selected direction, a plurality of collecting units spaced serially along said carrier, each collector unit including at least one cup member, means mounting each said unit to said carrier and supporting said cup member in a first position in which it normally extends in a sidewise direction from said carrier, said means operable to permit shifting of said cup member to a second position in which it is substantially upright with respect to the carrier, means for automatically effecting shifting of any of said cup members in said second position to said first position prior to their arrival on said upper flight, and said mounting means including means yieldably restraining said cup member in said respective first or second positions.

6. The combination as in claim 5 including a stationary tray-like structure positioned above the upper flight of said carrier, said tray structure located to receive the contents of any said cup member shifted to said second position while moving along said upper flight.

7. The combination as in claim 5 including washing means positioned adjacent said lower flight and operable to spray wash any of said cup members moving along said lower flight of said carrier and in said second position with respect thereto.

8. In an egg separating apparatus, the combination of a support frame, an endless carrier supported by said frame and arranged to provide upper and lower flights, means for driving said carrier for movement of the upper flight in a selected direction, a plurality of collector units spaced serially along said carrier and to one side thereof, each collector unit having a horizontally cantilevered yolk cup and white cup and normally positioned so that while moving along the upper flight of the carrier, the yolk cup is above the white cup and both cups are upwardly open, a pair of spaced stationary baffle members having portions positioned to catch matter discharged from the respective said cups during the transition passage from along the upper flight to along the lower flight and to direct the discharged contents of the separate cups on each unit to separate destinations, one of said baffle members located between the respective cups during the transition passage with the other of said baffle members outside the yolk cups during same.

9. The combination as in claim 8 including connector means mounting each said collector unit to said carrier for swinging movement between said normal position and a second position substantially at right angles thereto with the cups turned on side, and a stationary tray-like structure supported above said upper flight and so located to receive the contents of any said yoke cup swung to said second position while moving along said upper flight.

10. The combination as in claim 9 wherein said connector means includes automatically actuated holding means operable to releasably maintain said unit in said second position in response to the shift to said second position.

11. The combination as in claim 10 including camming means operable to engage and restore said units to said first position during the passage thereof toward the upper flight.

12. In an egg separating apparatus, the combination of a carrier, a bracket member connected to said carrier and extending to one side thereof, said bracket member including a frame located in a substantially vertical plane, a collector cup structure having locking means thereon interengageable with said frame, and resilient means engageable by a portion of said cup structure and operable to bias said cup structure in a direction to maintain said locking means engaged with said frame and to hold said cup structure in cantilever fashion on said frame.

13. The combination as in claim 12 wherein said bracket member includes a hinge joint between said carrier and said frame permitting swinging of the frame to an extended, horizontal position relative to the carrier, and means for releasably maintaining said frame in said extended position.

14. The combination as in claim 13 wherein said hinge joint includes a hing bar and a resiliently expandible sleeve-like element surrounding said bar, said bar and sleeve being of noncircular cross section and serving conjointly as said last named means.

15. In an egg separating apparatus, the combination of an endless chain-type carrier, a bracket member connected with and extending to one side of the carrier, said bracket member including a frame-like element having an upper stationary bar and a lower resiliently displaceable cross member, and a cup structure releasably mounted on said frame, said cup structure including locking elements positioned to be engaged respectively by said bar and cross member and releasable from the frame by displacement of said cross member.

16. The combination as in claim 15 wherein said bracket member includes a hinge joint permitting limited swinging movement of said frame relative to said carrier whereby to provide different positions for said cup structure.

References Cited by the Examiner
UNITED STATES PATENTS

| | | |
|---|---|---|
| 2,163,954 | 6/39 | Lucas. |
| 2,229,349 | 1/41 | Sigler. |
| 2,718,906 | 9/55 | Adams et al. |
| 3,029,849 | 4/62 | Willsey. |
| 3,098,495 | 7/63 | Bush. |

J. SPENCER OVERHOLSER, *Primary Examiner.*